United States Patent

[11] 3,595,062

| [72] | Inventor | Robert L. Stone<br>Austin, Tex. |
|---|---|---|
| [21] | Appl. No. | 719,021 |
| [22] | Filed | Apr. 5, 1968 |
| [45] | Patented | July 27, 1971 |
| [73] | Assignee | Columbia Scientific Industries Corporation<br>Austin, Tex. |

[54] THERMOCOUPLES FOR DTA
12 Claims, 9 Drawing Figs.

[52] U.S. Cl. .................................................. 73/15 B,
136/224
[51] Int. Cl. ..................................................... G01n 25/00
[50] Field of Search ........................................... 29/573;
73/15, 341; 136/201, 224

[56] References Cited
UNITED STATES PATENTS

| 1,893,748 | 1/1933 | Klopsteg | 136/225 |
| 2,875,613 | 3/1959 | Neal | 73/341 |
| 3,053,091 | 11/1962 | Braunagel | 73/341 |
| 3,285,053 | 11/1966 | Mazleres | 73/15 |
| 3,298,220 | 1/1967 | Stone et al. | 73/15 |
| 3,303,689 | 2/1967 | Paulik et al. | 73/15 |

Primary Examiner—James J. Gill
Assistant Examiner—Herbert Goldstein
Attorney—Arnold, White & Durkee ABSTRACT: Apparatus for differential thermal analysis, which can exhibit good sensitivity, includes as a differential thermocouple a loop of wire shaped to accept and support a sample dish, a thermoelectric bead in the loop of wire, and at least one electric lead wire extending downwardly from the loop of wire such that it can support the loop of wire and the sample dish during analysis. A thermocouple which has two thermoelectric beads disposed in parallel between its leads exhibits good sensitivity for differential thermal analysis.

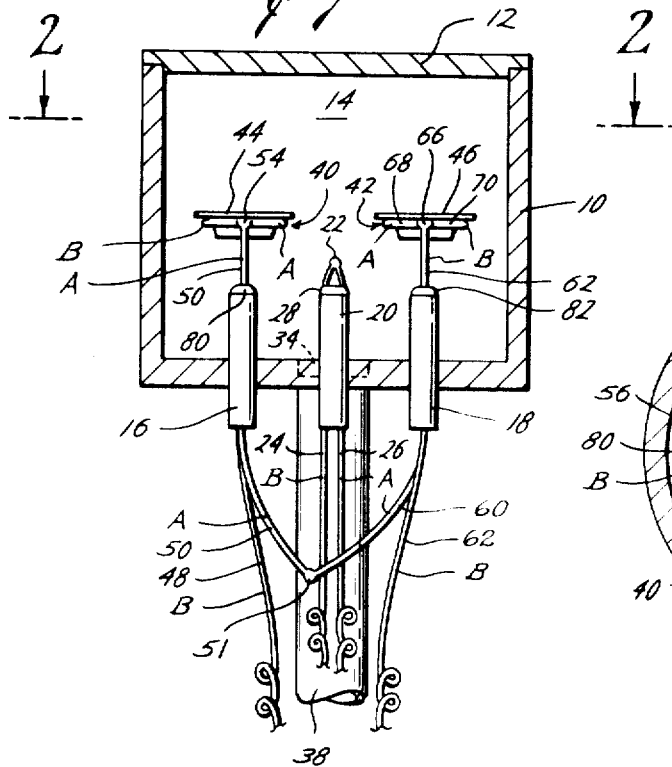
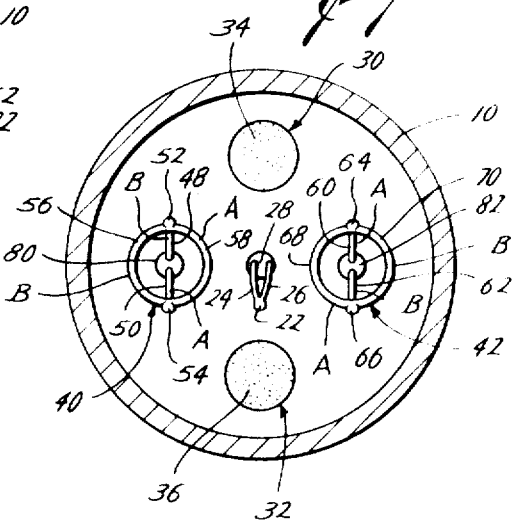
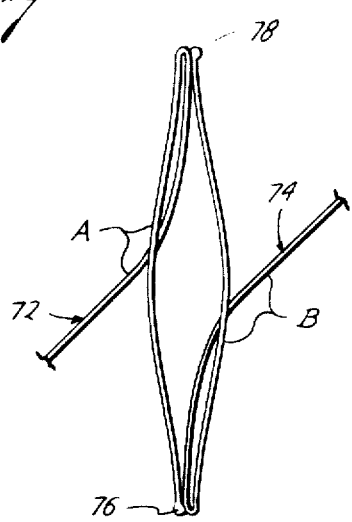
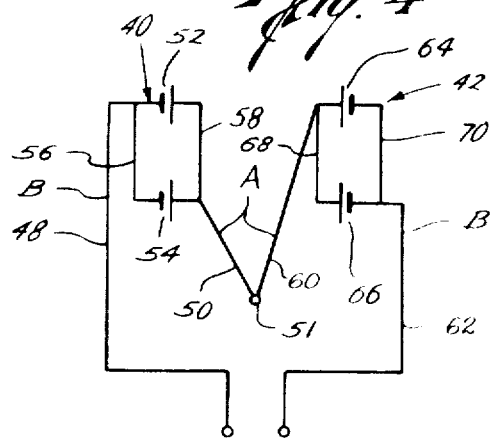
Robert L. Stone
INVENTOR
BY Arnold, Roylance, Kruger & Durkee
ATTORNEYS

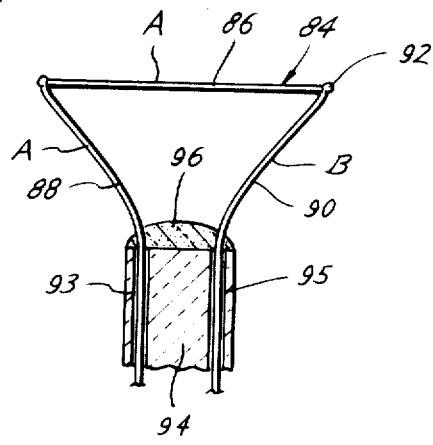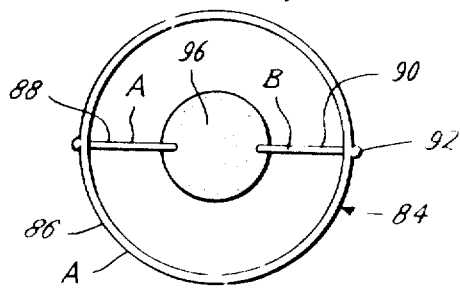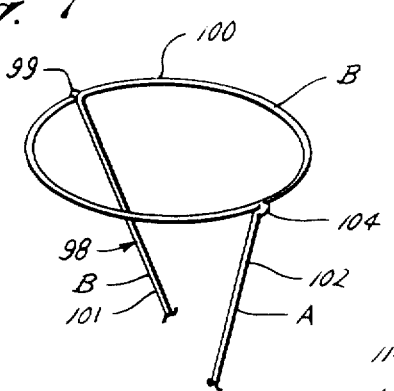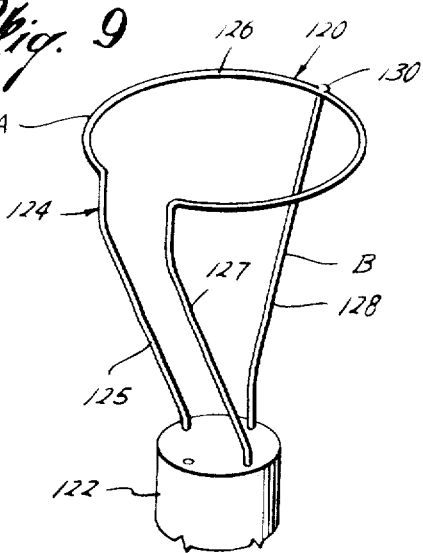

THERMOCOUPLES FOR DTA

BACKGROUND OF THE INVENTION

The invention relates to thermocouple constructions and to methods for making them, and particularly concerns constructions of differential thermocouples which are particularly useful in differential thermal analysis.

Differential thermal analysis is basically a technique for observing changes in energy level of a sample substance as a function of temperature. The changes may be observed by providing a pair of thermocouples connected in opposing electrical relationship with electrical leads from their other ends, placing a sample substance near one of the thermocouples and a reference substance near the other, heating the sample substance and the reference substance at a programmed rate, and observing the differential voltage developed by the pair of thermocouples. The voltage differential developed is proportional to the changes in energy level of the sample substance different from the changes in energy level of the known or reference substance.

The differential voltage developed may be traced on a chart by conventional techniques to form a record of the differential voltage over the heating range. Usually a standard thermocouple is disposed near the differential thermocouples to indicate the actual temperature around the sample in order to plot on the chart the differential voltage against the actual temperature. The graphs obtained are characteristic of the sample substance with respect to the reference substance, and may be employed for identification purposes. The graphs are also useful in the determination of the characteristics of a known sample substance, such as melting point, vaporization point, temperature at which a change in crystalline structure occurs, and the like. If a reactive substance or a reactive atmosphere is placed around or sufficiently near the sample substance, the temperature of reaction can also be obtained by the above technique. Further, the magnitude of the differential voltage indicates the heat of reaction.

Although differential thermal analysis is basically a simple technique, there are many difficulties which must be overcome in order to obtain a clear, easily readable graph or chart representative of the characteristics of the sample substance. Obviously, the apparatus for the analysis should be very sensitive and able to detect and convey to the graph minute changes in energy level of the sample substance. The apparatus should be capable of good resolution between closely adjacent thermal loops on the graph in order for the graph to indicate and distinguish among complex series of reactions. The apparatus should also be capable of producing a portrayal of the changes in energy level without spurious loops or wiggles which obscure the actual changes. Drift from the base line representing the reference sample as well as the characteristics of the apparatus should also be minimized.

A good thermocouple structure for differential thermal analysis which has met with commercial acceptance is described in U.S. Pat. No. 3,298,220, which issued to Robert L. Stone and George T. Burress on Jan. 17, 1967. This thermocouple structure is shaped to accept and support a sample dish whereby the sample substance is kept from reacting or fusing with the thermocouple bead and as a consequence harming the thermocouple.

Although apparatus described in this patent is commercially acceptable, the invention of new apparatus which can exhibit improved results, at least under particular circumstances, is always desirable.

SUMMARY OF THE INVENTION

In one embodiment of the invention, apparatus for differential thermal analysis comprises a sample holder enclosure comprising a sample holder block and a cap for the block, one of the cap and the block being cup-shaped and the other being shaped to fit over the open end of the one which is cup-shaped to define an interior space. A spaced pair of electrically and thermally nonconductive conduits extend substantially vertically through the block and a stand of wire is disposed above each of the conduits and within the interior space, each stand of wire being shaped to accept and support a sample dish. A thermoelectric bead is located in each stand of wire whereby the bead is closely associated with a sample dish when accepted thereon. At least one electrical lead wire extends upward from the top end of each conduit to the stand of wire above that conduit for supporting the stand of wire as well as providing an electrical lead from the thermoelectric bead. A second electric wire connects differentially a bead in one stand of wire to a bead in the other stand of wire, and in some embodiments also provides support for each stand of wire.

Such apparatus can exhibit an overall performance of good quality, particularly in regard to sensitivity, resolution, and minimization of drift. Sensitivity up to about two times that previously obtainable while using a sample dish between the thermocouple bead and the sample substance has been measured, and the apparatus still does not require direct contact between the bead and the sample substance to achieve good sensitivity.

In another embodiment of the invention, a thermocouple which is particularly useful in differential thermal analysis comprises two thermoelectric beads disposed in parallel between the electric leads of the thermocouple. Such a structure can lead to better indication of the temperature to be measured, and can permit easier control of drift by proper disposition in the enclosure.

In another embodiment of the invention a thermocouple comprises a stand of wire, such as a ring of wire, with one wire of the same thermocouple material as the stand of wire extending downwardly from the stand when disposed for use, and another wire of another thermoelectric material fused to the stand of wire and extending downwardly from the stand. The thermoelectric bead formed in the stand of wire between the two thermoelectric materials is closely associated with a sample dish when used in apparatus for differential thermal analysis. Actual tests on this particular embodiment have demonstrated good sensitivity.

The invention also includes method for making apparatus in accordance with the invention, these methods being described hereinafter.

DESCRIPTION OF THE DRAWING

In the drawing:

FIG. 1 is a schematic illustration in section of an embodiment of differential thermal analysis apparatus in accordance with the invention;

FIG. 2 is a schematic illustration of the apparatus shown in FIG. 1 taken along the line 2-2, with sample dishes removed;

FIG. 3 is a schematic illustration of one manner of making the thermocouple structures shown in FIG. 1 and FIG. 2;

FIG. 4 is an electrical diagram illustrating the differential voltage developed by the pair of differential thermocouples in the apparatus illustrated in FIG. 1 and FIG. 2;

FIG. 5 is a schematic illustration in section of one embodiment of a thermocouple in accordance with the invention;

FIG. 6 is a plan view of the thermocouple shown in FIG. 5;

FIG. 7 is a schematic illustration of another embodiment of a thermocouple in accordance with the invention;

FIG. 8 is a schematic illustration of one manner of making a thermocouple similar to the ones shown in FIGS. 5, 6, and 7; and FIG. 9 is a schematic illustration of yet another embodiment of a thermocouple in accordance with the invention.

DESCRIPTION OF ADVANTAGEOUS EMBODIMENTS

With reference to the drawings, the letter "A" refers to a wire of commercial grade composed of platinum and 10 percent rhodium by weight. The letter "B" refers to a wire of commercial grade composed of platinum. When such wires are fused to form a thermoelectric bead or junction, the wire A is positive with respect to the wire B in the usual electrical convention.

Other thermocouple combinations, of course, may be employed, such as iron-constantan, chromel-Alumel, and other thermocouple materials which when joined produce a thermoelectric effect, the preferred selection being dependent on the conditions and environment of use.

With reference to FIG. 1 and FIG. 2, the apparatus for differential thermal analysis there shown includes a sample holder enclosure comprising a cup-shaped block 10 fitted with a disc-shaped cap 12 to form an interior space 14. The block 10 and cap 12 are preferably made of thermally conductive material, such as aluminum, inconel, copper, stainless steel, nickel, platinum, other noble metals, and the like, although ceramics such as aluminum oxide, beryllium oxide, and magnesium oxide may be employed for particular environments.

Mounted in the base of the block 10, such as by friction fit, suitable cement, or mechanical holding, are two spaced electrically and thermally nonconductive tubes 16 and 18, each of which contain a pair of ducts through which thermocouple wires can pass. The tubes 16 and 18 may be made conveniently of porcelain or other suitable materials, such as the various ceramics. As used herein, the term "nonconductive" refers to a resistance of sufficient magnitude to accomplish the intended purpose, and obviously is not intended to refer to an infinite or perfect resistance.

A third electrically and thermally nonconductive tube 20 extends upwardly from the block 10 centrally of the block 10. The tube 20 can be made of the same materials as the tubes 16 and 18, and may be mounted in a similar manner. The tube 20 also includes a pair of ducts through which electric leads 24 and 26 from a standard thermocouple 22 pass out of the interior space 14 within the sample holder enclosure. The leads 24 and 26 are advantageously cemented in place at the upper end of the tube 20 by a suitable ceramic cement 28. The ceramic cement 28 may be conveniently an aluminum oxide cement, which is frequently composed of particulate aluminum oxide with clay as a binder, and which is capable of being sintered in place. Other ceramic cements of course may be employed. The leads 24 and 26 as shown are extensions of the materials which form the thermocouple 22, although other materials may be employed as the leads as long as any additional thermoelectric effects are balanced.

A pair of gas inlets 30 and 32 are located to open through the base of the block 10, these inlets suitably comprising porous ceramic or metal discs 34 and 36, such as aluminum oxide discs, through which gas can enter the interior space 14. The particular location of the gas inlet or inlets can be varied if desired. As shown in FIG. 1, a gas tube 38 communicates with the disc 34 to supply gas to the interior space 14 through the disc 34. A similar tube (not shown) communicates with the disc 36. The type of gas supplied, or whether or not any gas is supplied, is of course dependent on the particular analysis which is desired.

A differential pair of thermocouples 40 and 42 are located above the tubes 16 and 18 respectively. The thermocouples 40 and 42 as shown are shaped in the form of a closed ring to accept and support a pair of disc-shaped sample dishes 44 and 46 respectively. The thermocouples 40 and 42 may comprise other shapes, such as a portion of a ring preferably larger than a semicircular portion, or may be rectilinear in nature, such as in the form of a square or rectangle. In addition, the supporting stand formed by the thermocouple may be designed to include both curved and rectilinear features, such as hexagonal or octagonal shapes. In general, the thermocouples 40 and 42 should be shaped to form a stand of wire, or loop of wire, such that the thermocouples can accept and support a sample dish thereon with the thermoelectric junction or junctions in the thermocouple being closely associated preferably in direct contact with the sample dishes when accepted thereon. The sample dishes 44 and 46, on the other hand, should be shaped correspondingly with the shape of the thermocouples 40 and 42 to permit support by the thermocouples 40 and 42 in close association with the thermoelectric junctions.

The sample dishes 44 and 46 are preferably made of thermally conductive material, such as aluminum, inconel, copper, stainless steel, nickel, the noble metals, and the like, in order to transmit the heat changes in the sample to the thermocouple junctions readily.

The thermocouple 40 includes between its electric leads 48 and 50 a pair of thermoelectric beads 52 and 54 disposed in parallel. Wires 56 and 58 connect the beads 52 and 54 electrically and also form a closed ring to permit support of the sample dish 44. The leads 48 and 50 pass out of the sample holder enclosure through a pair of ducts in the tube 16.

Similarly, the thermocouple 42 includes between its electric leads 60 and 62 two thermoelectric beads 64 and 66 arranged in parallel. Two wires 68 and 70 connect the beads 64 and 66 electrically and form a ring in order to support the sample dish 46. The leads 60 and 62 pass out of the sample holder enclosure through a pair of ducts in the tube 18.

The leads 50 and 60 are connected, such as by fusion, outside of the sample holder enclosure as indicated at 51, or at considerable distance outside the sample holder enclosure, to connect the thermocouples 40 and 42 differentially. The thermocouples 40 and 42, however, can be connected differentially by a wire or wires existing entirely inside of the sample holder enclosure if one so desires. The leads 48 and 62 are available for connection to apparatus for measuring the differential voltage developed during analysis between the thermocouples 40 and 42.

Each of the wires mentioned above is indicated in the drawings to be either a wire of platinum, or a wire of platinum with 10 percent rhodium, by suitable designation with the letters A and B. Wires of other thermocouple materials may be employed, of course, and wires of other conductive materials may be substituted as a part or parts of the electrical circuit as long as any added thermoelectric effects can be tolerated.

The electrical circuit diagram of the differential pair of thermocouples 40 and 42 is illustrated in FIG. 4, in which the designated parts are the same as those used in FIG. 1 and FIG. 2.

FIG. 3 illustrates a method for making the thermocouples 40 and 42. As there shown, a wire 72 made of material A and a wire 74 made of material B are formed in relation to one another such that one end 76 of the wire 72 touches the wire 74 a predetermined distance from the end 78 of the wire 74. The end 78 of the wire 74 touches the wire 72 a predetermined distance from the end 76 of the wire 72. The end 76 of the wire 72 is then fused, such as by a suitable torch, to the wire 74 at the predetermined location to form a thermoelectric bead or junction. Similarly, the end 78 of the wire 74 is fused to the wire 72 at a predetermined distance from the end 76 to form a thermoelectric bead or junction. The joined portions of the wires 72 and 74 are then formed into the shape of a ring and the free ends of the wires 72 and 74 are employed as electric leads from the junctions formed by fusion. The resultant thermocouple of course includes two thermoelectric beads between its leads as indicated in the electrical diagram in FIG. 4.

After the thermocouples 40 and 42 are suitably located above the tubes 16 and 18 with the leads passing through the ducts of the tubes 16 and 18, the apparatus is preferably tested to determine the extent of any drift. Movement of the thermocouples 40 and 42 within the sample holder enclosure can allow a correction for drift and once the correction is made, a spot of ceramic cement 80 may be used to cement the leads 48 and 50 associated with the thermocouple 40 in place with respect to the tube 16. A spot of ceramic cement 82 may be employed similarly with respect to the thermocouple 42 spaced above the tube 18. Other means of holding the thermocouples 40 and 42 in place may be employed if desired.

One of the advantages of a thermocouple having two electric beads arranged in parallel between its leads is that the thermocouple permits relatively easy correction for drift in apparatus for differential thermal analysis.

With reference to FIG. 5 and FIG. 6, another embodiment of a structure in accordance with the invention is illustrated schematically. As there shown, a thermocouple 84 comprises a closed ring of wire 86 made of material A to which has been fused a wire 88 made of material A and a wire 90 made of material B, preferably in diametrical disposition. The wires 88 and 90 are so fused and formed to extend downwardly from the ring of wire 86, away from the supporting top side of the ring 86 and generally toward the central axis of the ring 86. The fusion of the wire 90 to the ring 86 forms a thermoelectric bead 92. The wires 88 and 90 pass into a pair of ducts 93 and 95 in a thermally and electrically nonconductive tube 94, and a spot of cement 96 is employed to cement the wires 88 and 90 in place with respect to the tube 94. Consequently, a stand of wire is formed which will accept and support a sample dish in differential thermal analysis and which will have the junction 92 closely associated with the sample dish when accepted thereon.

Another thermocouple in accordance with the invention is illustrated in FIG. 7. As there shown, one end of a wire 98 is shaped in the form of a ring 100 with the free end 101 of the wire 98 extending downwardly away from the plane of the ring 100 and generally toward its central axis. The end of the wire 98 which forms a part of the ring 100 may be fused to itself at 99 to form a closed ring, or may be left open if sufficient support can be provided with its being open. A second wire 102 made of material A is fused to the ring 100, preferably diametrically with respect to the free end 101 of the wire 98 to form a thermoelectric bead or junction 104. The wire 102 is then shaped to extend downwardly from the ring 100 away from the plane of the ring 100 and generally toward its central axis. Consequently, a thermocouple is formed which may be used in the apparatus shown in FIG. 1.

A thermocouple similar to the one in FIG. 7 may also be made in accordance with the manner illustrated in FIG. 8. With reference to FIG. 8, a wire 106 is formed into a loop of wire by bending an end of the wire back towards itself, and then bending a portion of the bent portion back towards the first bend to form a loop, whereby the original free end of the wire 108 is adjacent the first bend in the wire 106 and a free end 110 of the wire 106 is established. The end 108 of the wire 106 can then be fused at 112 to itself and a wire 114 made of material B fused to the second bend in the loop formed in the wire 106, preferably substantially diametrically from the fusion at 112, to form a thermoelectric bead or junction 116. The fused wires may then be shaped into a form substantially as shown in FIG. 7, if desired, with the free end 110 of wire 106 and the wire 114 extending generally toward the central axis of the loop in the wire 106.

Another embodiment of a thermocouple structure in accordance with the invention is illustrated in FIG. 9. As there shown, the thermocouple 120 is supported above a tube 122 which contains four ducts therein allowing passage of thermocouple wires. Such tubes 122 are most commonly available with four ducts as shown, however, tubes with three, five, six, etc. ducts could also be used. The thermocouple 120 is formed by a wire 124 made of material A shaped such that a part of a ring 126 is formed therein with the free ends 125 and 127 of the wire 124 extending downwardly away from the plane of the portion of the ring 126 and generally toward its central axis. A wire 128 made of material B is then fused to the ring 126 to form a thermoelectric junction 130, preferably at a location opposite from the free ends 125 and 127. The wire 128 also extends downwardly from the ring 126 generally towards its axis and passes into one of the ducts in the tube 122 and then on out to a location where an electrical connection can be made. The two free ends 125 and 127 of the wire 124 pass into two other ducts respectively of the tube 122, and one of these free ends may be employed as an electrical lead from the junction 130. The other free end can be maintained free of electrical connection, but it still acts as an additional support for the portion of a ring 126 above the tube 122.

When the FIG. 9 structure is employed to form a differential pair of thermocouples in a sample holder enclosure as illustrated in FIG. 1, the structures are preferably arranged with the thermoelectric junction of each thermocouple in the pair being located to face centrally of the enclosure. This arrangement is symmetrical and has been found to produce good results as compared with unsymmetrical arrangements. Likewise, in the FIG. 1 construction, location of the thermoelectric junctions in each thermocouple as shown along a line perpendicular to a line passing through the centers of the enclosure and the thermocouples is preferred, since uniform heating of the junctions from the walls of the enclosure is enhanced.

Apparatus in accordance with the invention exhibits improved sensitivity and approaches closely the theoretical energy change involved in the sample, probably because of the minimization of extraneous heating and cooling effects near the thermoelectric beads. On the other hand, thermocouple structures in accordance with the invention do provide adequate support of sample dishes because of the location of the wires and the natural resistance of the structures to bending even at high temperatures. In this regard, structures in accordance with the invention permit usage of wires of relatively small diameter, the smaller wires minimizing conduction of heat along the wires and consequent spurious results.

The apparatus described herein may be combined with suitable furnaces, insulation, analysis platforms, amplifiers, recording instruments, programmers, etc. known now or hereafter to the art to provide a complete unit for differential thermal analysis. It will also be understood by persons in the art that while certain advantageous embodiments have been chosen to illustrate the invention, various changes and modifications can be made without departing from the spirit or scope of the inventions.

In this regard, one or more leads from the differential pair of thermocouples may be passed into a single duct in a tube mounted in the sample holder block, or into one or more passages in the block itself, if suitable insulation is provided and if a suitable cement or other means is employed to hold the leads in place and allow adequate support for a sample dish.

What I claim is:

1. Apparatus for analyzing a sample by differential thermal analysis, said apparatus comprising a sample holder enclosure comprising a sample holder block and a cap for said block, one of said cap and said block being cup-shaped and the other being shaped to fit over the open end of the one which is cup-shaped, thereby defining an interior space; a spaced pair of electrically and thermally nonconductive conduits extending substantially vertically through said block; a stand of wire disposed above each of said conduits and within said interior space, each stand of wire including a first portion of one thermocouple material and a second portion of another thermocouple material, said first and second portions being fused together at two spaced locations to provide two thermoelectric beads, each stand of wire being shaped to accept and support a sample dish thereon with the thermoelectric beads being closely associated with the sample dish when accepted thereon; at least one electrical lead wire extending upward from the top end of each conduit to the stand of wire thereabove for supporting the stand of wire and providing an electrical lead from the beads therein; and an electric wire connecting differentially the beads in one stand of wire to the beads in the other stand of wire.

2. A thermocouple comprising a first wire of one thermocouple material, and a second wire of another thermocouple material, one end of said first wire being fused to said second wire a predetermined distance from one end of said second wire to form a first thermoelectric bead, said one end of said second wire being fused to said first wire to form a second thermoelectric bead spaced apart from said first thermoelectric bead, said beads being disposed to sense substantially the same temperature.

3. A thermocouple comprising a first wire of one thermocouple material, and a second wire of another thermocouple material; said first wire and said second wire providing electric leads and being fused at two spaced locations to provide two thermoelectric beads, said beads being disposed to sense substantially the same temperature.

4. The thermocouple defined in claim 3 wherein said beads are part of a loop of wire between said leads.

5. Apparatus for differential thermal analysis comprising a sample holder enclosure, a circuit for indicating temperature in said enclosure, and as a part of said circuit a thermocouple having a first wire of one thermocouple material, and a second wire of another thermocouple material, said first wire and said second wire providing two electric leads and being fused at two spaced locations to provide two thermoelectric beads, said beads being disposed in said enclosure to sense substantially the same temperature to be indicated and said leads being connected to said circuit.

6. Apparatus as defined in claim 5 wherein said thermocouple is differentially connected to another similar thermocouple having two thermoelectric beads.

7. A method of making a thermocouple suitable for supporting a sample dish thereon during differential thermal analysis, which method comprises fusing a first wire of one thermocouple material to a second wire of another thermocouple material at a predetermined distance from an end of the second wire to form a thermoelectric bead, fusing a part of the second wire on one side of said bead to a part of the second wire on the other side of said bead to form a loop of wire containing the thermoelectric bead and having a portion of the second wire extending from the loop, and shaping the loop of wire into a ring of wire with the first wire and said portion of the second wire extending away from the supporting side of the loop of wire and generally toward the axis of the loop of wire.

8. A method of making a thermocouple suitable for supporting a sample dish thereon during differential thermal analysis, which method comprises bending a first thermocouple wire near one end thereof in the shape of a loop, fusing the first wire to itself to form a closed loop of wire with a portion of the first wire extending from the loop, fusing a second thermocouple wire of different material to said closed loop approximately opposite from said portion of first wire to form a thermoelectric bead, and shaping said portion of the first wire and said second wire whereby each extends away from the supporting side of the closed loop and generally toward the axis of the closed loop.

9. A method of making a thermocouple suitable for supporting a sample dish thereon during differential thermal analysis, which method comprises providing a closed loop of wire of a first thermocouple material; fusing a first wire of the first thermocouple material to said loop; fusing a second wire of second thermocouple material to said loop to form a thermoelectric bead, whereby said first wire and said second wire are approximately oppositely disposed on said loop; and shaping said first wire and said second wire whereby such extends away from the supporting side of said loop and generally toward the axis of said loop.

10. A method of making a thermocouple suitable for supporting a sample dish thereon during differential thermal analysis, which method comprises bending a first wire of first thermocouple material into a partially open loop of wire with portions of said first wire extending from each side of the open portion of said loop, bending said portions of said first wire whereby each extends away from the supporting side of said loop and generally toward the axis of said loop, and fusing and shaping a second wire of second thermocouple material to said loop approximately opposite from the open portion thereof to form a thermoelectric bead, whereby said second wire extends away from said supporting side of said loop and generally toward the axis of said loop.

11. A method of making a thermocouple suitable for supporting a sample dish thereon during differential thermal analysis, which method comprises fusing a first wire of one thermocouple material to a second wire of a second thermocouple material at two different locations to form two thermoelectric beads, and shaping the first wire and the second wire to form a loop of wire whereby the thermoelectric beads are disposed in the loop of wire.

12. The method defined in claim 11 wherein free ends of the first wire and the second wire are shaped to extend away from the loop and generally toward the central axis of the loop.